ent (10) Patent No.: US 8,391,027 B2
(45) Date of Patent: Mar. 5, 2013

(12) United States Patent
Lidak et al.

(54) QUASI-RESONANT POWER SUPPLY CONTROLLER AND METHOD THEREFOR

(75) Inventors: Petr Lidak, Hladke Zivotice (CZ);
Christophe Basso, Pibrac (FR);
Stephanie Conseil, Colomiers (FR);
Frantisek Sukup, Zasova (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 259 days.

(21) Appl. No.: 13/063,162

(22) PCT Filed: Nov. 14, 2008

(86) PCT No.: PCT/US2008/083588
§ 371 (c)(1),
(2), (4) Date: Mar. 9, 2011

(87) PCT Pub. No.: WO2010/056249
PCT Pub. Date: May 20, 2010

(65) Prior Publication Data
US 2011/0182088 A1    Jul. 28, 2011

(51) Int. Cl.
*H02M 3/335* (2006.01)
*H02M 3/315* (2006.01)

(52) U.S. Cl. .............. 363/21.03; 363/20; 363/21.01; 363/21.02; 363/21.12; 363/21.15; 363/21.16; 363/21.17; 363/21.18

(58) Field of Classification Search .......... 363/20, 363/21.01, 21.02, 21.03, 21.12, 21.15, 21.16, 363/21.17, 21.18
See application file for complete search history.

(56) References Cited

U.S. PATENT DOCUMENTS

| 5,892,355 | A | 4/1999 | Pansier et al. |
| 6,341,073 | B1 | 1/2002 | Lee et al. |
| 6,842,350 | B2 | 1/2005 | Yamada et al. |
| 6,850,422 | B2 | 2/2005 | Strijker |
| 6,958,920 | B2 * | 10/2005 | Mednik et al. .................. 363/19 |
| 7,248,487 | B1 | 7/2007 | Indika de Silva et al. |
| 7,884,588 | B2 * | 2/2011 | Adragna et al. .............. 323/272 |
| 8,144,486 | B2 * | 3/2012 | Moon et al. ................. 363/21.12 |
| 2004/0264216 | A1 * | 12/2004 | Mednik et al. .................. 363/18 |
| 2005/0073862 | A1 * | 4/2005 | Mednik et al. .................. 363/20 |
| 2007/0121258 | A1 | 5/2007 | Hachiya |
| 2009/0086513 | A1 * | 4/2009 | Lombardo et al. ......... 363/21.12 |
| 2010/0110732 | A1 * | 5/2010 | Moyer et al. .................... 363/19 |

FOREIGN PATENT DOCUMENTS

WO       WO00/74221 A1    12/2000

OTHER PUBLICATIONS

On Semiconductor, "DAP013A/B/C/D Product Review Quasi-Resonant Current Mode Controller for High Power Universal Off-Line Supplies", Copyright 2008 Semiconductor Components Industries, LLC, Jan. 2008—Rev. P0, Publn Order No. DAP013/D, 10 pages.
Infineon Technologies, Power Management & Supply, PWM-QR IC TDA 16846/16846-2 TDA16847/16847-2 Controller for Switch Mode Power Supplies Supporting Low Power Standby and Power Factor, Datasheet, V2.0, Jul. 31, 2003, 28 pages.

* cited by examiner

*Primary Examiner* — Bao Q Vu
(74) *Attorney, Agent, or Firm* — Robert F. Hightower

(57) ABSTRACT

In one embodiment, a quasi-resonant power supply controller is configured to select particular valley values of a switch voltage to determine a time to enable a power switch. The valleys values are selected responsively to a range of values of a feedback signal.

20 Claims, 3 Drawing Sheets

QUASI-RESONANT POWER SUPPLY CONTROLLER AND METHOD THEREFOR

BACKGROUND OF THE INVENTION

The present invention relates, in general, to electronics, and more particularly, to semiconductors, structures thereof, and methods of forming semiconductor devices.

In the past, the semiconductor industry utilized various methods and structures to build switching power supply controllers that could be utilized in a power supply system such as in a flyback switching power supply system. In some applications, the switching power supply controllers were designed to operate in a discontinuous conduction mode and to use a value of the drain-to-source voltage across the switch transistor to determine the proper time for enabling the switch transistor. This was often referred to as a quasi-resonant operation or valley switching operation. During the operation of these power supply controllers, the switching frequency varied because the circuit kept the switch transistor disabled for a variable amount of time based on the voltage across the switch transistor. Because the frequency varied, prior controllers used different techniques to determine the proper time to re-enable the switch transistor. One particular technique sampled the frequency of oscillations there were formed by the voltage on the drain of the switch transistor and used the frequency to determine the proper time for re-enabling the switch transistor. However, this technique required complex circuitry which increased the cost of the power supply controller.

Accordingly, it is desirable to have a power supply controller that utilizes less complex circuitry, and that has a lower cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described.

DETAILED DESCRIPTION OF THE DRAWINGS

Figure 1:
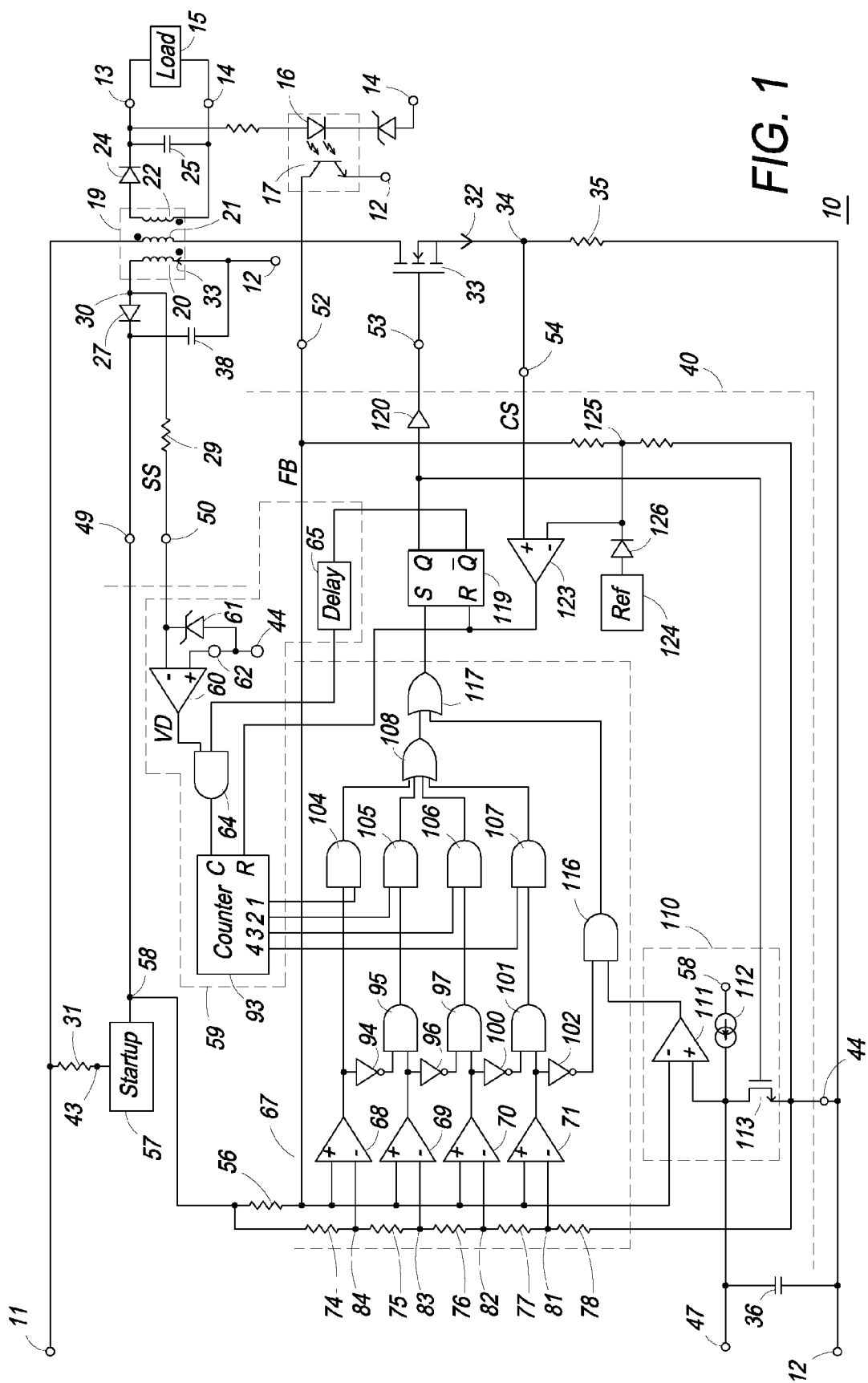
FIG. 1 schematically illustrates an embodiment of a portion of a system FIG. 1 schematically illustrates a portion of an embodiment of flyback power supply system that also illustrates a portion of an exemplary embodiment of a power supply controller that is configured to operate in a quasi-resonant mode in accordance with the present invention.

FIG. 1 schematically illustrates a portion of an embodiment of flyback power supply system 10 that also illustrates a portion of an exemplary embodiment of a power supply controller 40 that is configured to operate in a quasi-resonant mode. System 10 receives an input voltage between a power input terminal 11 and a power return terminal 12, and regulates a value of an output voltage between a voltage output 13 and a voltage return 14. The output voltage usually is regulated to a target value within a range of values around the target value. For example, the target value may be five volts (5 v) and the range of values may be plus or minus five percent (5%) around the five volts. A load 15 is connected between output 13 and return 14 to receive the output voltage and an output current in order to operate load 15. System 10 typically includes a transformer 19 that has a primary inductor or primary winding 21 that is connected to a switch, such as a power transistor 33. Controller 40 forms a switching drive signal that is used to operate transistor 33 and control a switch current 32 that flows through both transistor 33 and the primary or winding 21 in order to regulate the value of the output voltage. A sense resistor 35 typically is connected to transistor 33 in order to form a current sense (CS) signal that is representative of current 32. A secondary inductor or secondary winding 22 of transformer 19 is connected to supply a secondary voltage that is utilized to form the output voltage. In order to assist in forming the output voltage, a rectifier diode 24 typically is connected to winding 22 and a filter capacitor 25 typically is connected in parallel with output 13 and return 14. An auxiliary inductor or auxiliary winding 20 of transformer 19 is utilized to form an auxiliary voltage across winding 20 that is used to form an operating voltage for operating controller 40. A diode 27 and a capacitor 38 assist in forming the operating voltage. As will be seen further hereinafter, the switching of transistor 33 forms oscillations of a switch voltage. Controller 40 is configured to use a sense signal that is representative of the output voltage and to enable transistor 33 during one valley value, of a plurality of valley values that occur during the oscillations, responsively to a value of the sense signal.

Controller 40 is connected to receive a startup voltage for the initial startup operation of controller 40 through a high voltage input 43 and a common return 44. High-voltage input 43 generally is connected to terminal 11 through a resistor 31 so that controller 40 may receive the input voltage (Vin) from terminal 11. Controller 40 includes an operating voltage input 49, a switch voltage sense (SS) input 50, a feedback (FB) input 52, a drive output 53, a current sense input 54, and a frequency control input 47. Controller 40 also includes a control circuit 67, a detector circuit or detector 59, a variable frequency oscillator (VCO) 110, and a switching control circuit that includes a PWM latch 119, a current sense (CS) comparator 123, and a high current driver 120. Control circuit 67 includes comparators 68-71, AND gates 95, 97, 101, 104-107, and 116, inverters 94, 96, 100, and 102, OR gates 108 and 117, and a reference generator that includes voltage divider connected resistors 74-78. Detector 59 includes a valley comparator 60, a reference generator or reference 62, a clamp diode 61, an AND gate 64, a delay circuit 65, and a counter 93. VCO 110 includes a current source 112, a switch transistor 113, and a comparator 111. Such VCO circuits are well known to those skilled in the art.

Controller 40 also typically includes a startup circuit 57 that receives the input voltage from high voltage input 43 and assists in forming an operating voltage for operating controller 40. When power is first applied between terminals 11 and 12, startup circuit 57 receives an input current from terminal 11 through resistor 31. Circuit 57 uses this input current to supply a startup current through input 49 and charge capacitor 38. When the value of the voltage across capacitor 38 reaches a desired value of the operating voltage for operating controller 40, startup circuit 57 inhibits forming the startup current and typically supplies a signal (not shown) to other circuits of controller 40 that allows controller 40 to begin operating. As controller 40 begins operating and switching transistor 33, a voltage is formed across auxiliary winding 20 and a current is applied through diode 27 to maintain capacitor 38 charged at the desired operating voltage for operating controller 40. During normal operation, the current from auxiliary winding 20 maintains capacitor 38 charged at the desired operating voltage and startup circuit 57 no longer supplies the startup current to capacitor 38. Such startup circuits and auxiliary winding configurations are well known to those skilled in the art.

The switching drive signal formed by controller 40 enables transistor 33 in order to allow current 32 to flow through winding 21 and store energy within transformer 19. Current 32 flowing through resistor 35 forms the current sense (CS) signal, at a node 34, that is representative of the value of current 32. Comparator 123 compares the CS signal to a signal from a node 125 that is representative of the FB signal and that is higher than the voltage from a reference generator or ref 124. When the value of the current sense signal is approximately equal to the value of the voltage from node 125, the output of comparator 123 goes high to reset latch 119 and negate the switching drive signal. Negating the switching drive signal disables transistor 33 and terminates the flow of current 32. As can be seen, the peak value of current 32 is a function of the value of the output voltage (through the FB signal). Disabling transistor 33 causes transformer 19 to transfer the stored energy to windings 20 and 21 thereby transferring power to charge capacitor 25 and operate load 15, and also to regulate the operating voltage on input 49. Disabling transistor 33 also causes the voltage formed between the drain of transistor 33 and terminal 12, the switch voltage, to increase.

Figure 2:
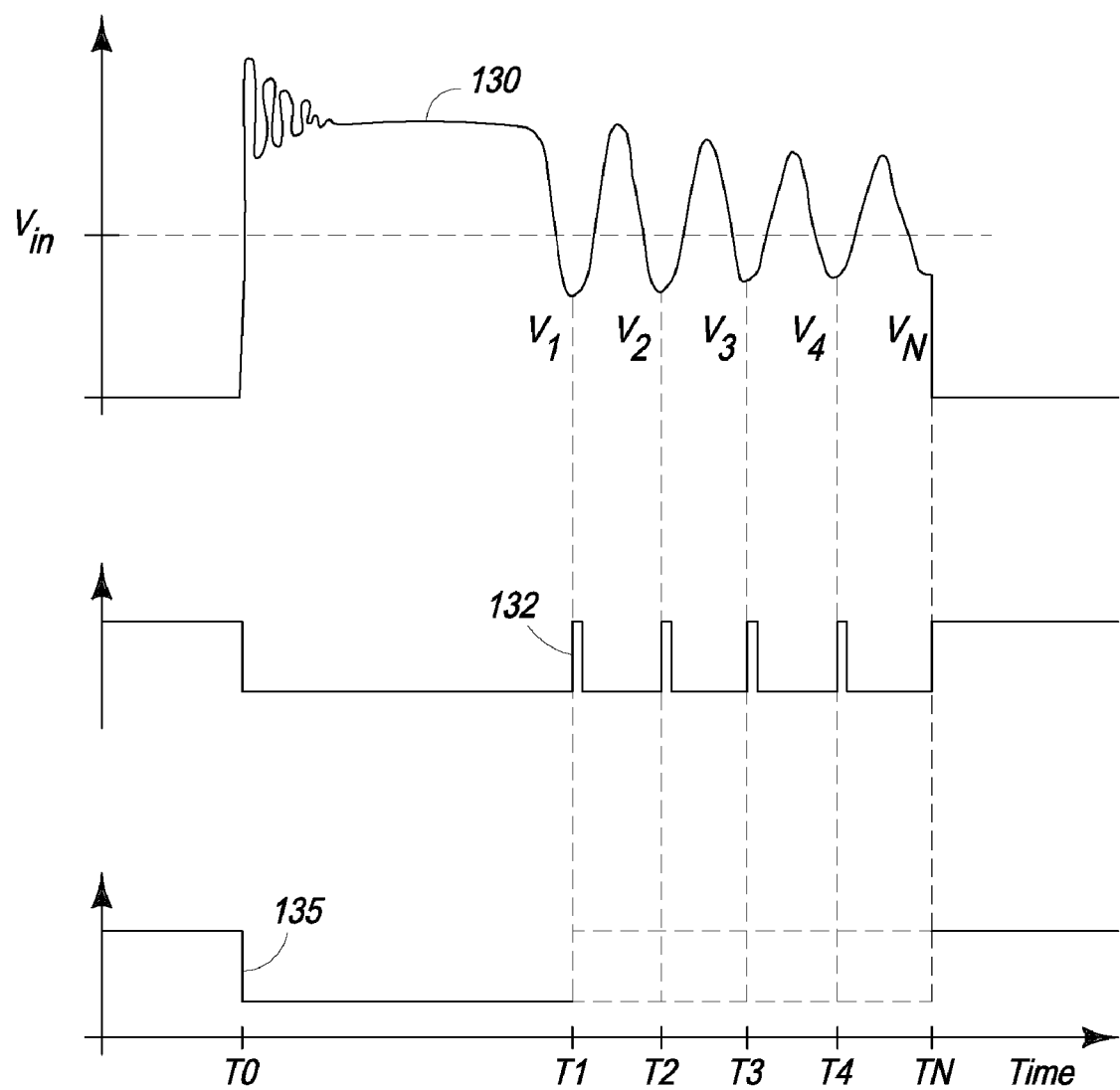
FIG. 2 is a graph having plots that illustrate some of the signals formed by the power supply controller of FIG. 1 in accordance with the present invention.

FIG. 2 is a graph having plots that illustrate a portion of one switching cycle that is formed by controller 40. The abscissa indicates time and the ordinate indicates increasing value of the illustrated signal. A plot 130 illustrates the switch voltage formed between the drain of transistor 33 and return 12, a plot 132 illustrates a valley detected (VD) signal formed by valley comparator 60, and a plot 135 illustrates a portion of one cycle of the switching drive signal. Prior to a time T0 the switching drive signal is asserted as illustrated by plot 135 therefore transistor 33 is enabled and the value of the switch voltage is less than the value of the input voltage (Vin). Since latch 119 is set, the Q-bar output is low which forces the output of gate 64 low to ensure that counter 93 is not affected by noise (such that of the leakage inductor ringing) or other signals received on input 50. At time T0, comparator 123 resets latch 119 and negates the switching drive signal to disable transistor 33. The inductance of winding 21 pulls the drain of transistor 33 high to a voltage that is greater than the input voltage (Vin) which usually causes some ringing of the switch signal. This causes the switch voltage to increase until rectifier diode 24 conducts. At this point, the value of the switch voltage reaches the voltage of terminal 11 plus the so-called flyback voltage from transformer 19. This voltage level lasts as long as the energy stored in transformer 19 is fully transferred to the secondary side. When this period of time has elapsed, diode 24 blocks and the switch voltage returns to the voltage of terminal 11 via a series of N number of damped periodic oscillations as illustrated at times T2-TN. Note that resetting latch 119 forces the Q-bar output of latch high which triggers delay circuit 65 to keep the output of circuit 65 low for a time period after the Q-bar output goes high. This insures that the ringing of the switch signal at time T0 does not affect counter 93. Additionally, the high from comparator 123 resets counter 93 to prepare it for counting the valley values of the switch signal. Energy is transferred to the secondary side of transformer 19 and the switch voltage remains relatively constant as shown by plot 130 after time T0 to just prior to a time T1 when the energy transfer is completed and the flux within transformer 19 is collapsing. Because of the parasitic capacitance of transistor 33, the rapid change in voltage resulting from the demagnetizing of transformer 19 causes oscillations in the switch voltage as illustrated by plot 130 beginning just prior to time T1 and continuing thereafter. The oscillations of the switch voltage form peak values and valley values or minimum values of the switch voltage. Because the energy transfer to the secondary is complete, it is time to re-enable transistor 33. However, it is desirable to re-enable transistor 33 when the value of the switch voltage is at a minimum value or valley value. Enabling transistor 33 when the switch voltage is a minimum value improves the efficiency of system 10.

Detector 59 and control circuit 67 are configured to detect the valley values of the switch voltage, such as the plurality of valley values illustrated as valley values V1-Vn, and to cause transistor 33 to be enabled during one valley value of these plurality of valley values. Controller 40 selects one of the valley values (V1-Vn) responsively to the value of the feedback signal. Circuit 67 receives the feedback (FB) signal and forms a plurality of value ranges of the feedback signal around a plurality of values of the feedback signal so that a different value range of the plurality of ranges is formed around different values of the feedback signal. Comparators 68-71 assist in forming the range of values around the different values of the feedback signal. The resistor divider formed by resistors 74-78 functions as a reference generator that forms a plurality of reference voltage values. The resistor divider forms a first reference voltage at a node 84 that has a first value, forms a second reference voltage at a node 83 that has a value that is less than the first reference voltage, forms a third reference voltage at a node 82 that has a value that is less than the second reference voltage, and forms a fourth reference voltage at a node 81 that has a value that is less than the third reference voltage.

Detector 59 is configured to detect the plurality of valley values during a cycle of the switching drive signal and responsively form a plurality of valley detection signals wherein a first valley detection signal is representative of detecting a first valley value, such as valley value V1, of the plurality of valley values and a second valley detection signal is representative of detecting a second valley value, such as valley value V2, of the plurality of valley values that is different from the first valley value, etc. Detector 59 is configured to assert a separate control signal for each valley value upon detecting the occurrence of that particular valley value. The auxiliary voltage formed across the inductance of auxiliary winding 20 causes current 32 to flow through winding 20, through a resistor 29, and form a switch sense signal at a node 30 that has a voltage that is representative of the value of the switch voltage. However, the value of the switch sense signal is referenced to the value of return 12, therefore, the switch sense signal at node 30 is representative of the switch voltage and forms the switch voltage sense (SS) at input 50 that is also representative of the switch voltage. Valley comparator 60 receives the switch voltage signal from input 50 and compares the switch sense signal to a reference signal from reference 62. As the switch voltage oscillates, the valley values that are formed cause the value of the switch sense signal to decrease below the value of the reference voltage from reference 62. Since counter 93 was previously reset by comparator 123, each time the switch voltage reaches a valley value, such as values V1-VN, the output of comparator 60 goes high as illustrated by plot 132 thereby forcing the valley detected (VD) signal high. Since counter 93 was previously reset by comparator 123, the high from comparator 60 increments counter 93 which forces the first output (output one) of counter 93 high. Thus, the first valley value, V1, causes counter 93 to increment and assert the first valley detection signal at output one of counter 93. The second valley value, V2, causes counter 93 to increment again and assert the second valley detection signal at output two of counter 93 in addition to keeping the first valley detection signal asserted. The third valley value, V3, causes counter 93 to increment again and assert the third valley detection signal at output three of counter 93 in addition to keeping the first and second valley detection signals asserted. This incrementing of counter 93 continues for subsequent occurrences of the valley values during this cycle of the switching drive signal.

Circuit 67 is configured to select one of the valley detection signals of the plurality of valley detection signals responsively to one value range of the plurality of value ranges of the output voltage (as represented by the feedback signal). If the value of the feedback signal is within the first range of values, such as greater than the first reference voltage at node 84, the output of all of comparators 68-71 are high. However, the logic circuit formed by inverters 94, 96, and 100 and gates 95, 97, and 101 inhibit the output of comparators 69, 70, and 71 from affecting the control of the switching drive signal. The high from the output of comparator 68 forces the output of inverter 94 low which forces the output of gate 95 low and prevents comparator 69 from affecting the switching drive signal. The low from gate 95 also forces the output of gate 105 low which inhibits output two of counter 93 from affecting the switching drive signal. Similarly, the high from comparator 69 forces the output of inverter 96 low which forces the output of gate 97 low and the output of gate and 106 low thereby preventing the output of comparator 70 and also prevents comparator 70 and output three of counter 93 from affecting the switching drive signal. Similarly, the high from comparator 70 forces the output of inverter 100 low which in turn forces the output of gate 101 low and the output of gate 107 low thereby inhibiting the output of comparator 71 and output four of counter 93 from affecting the switching drive signal. Thus, it can be seen that as long as the value of the feedback signal is within the first range of values of the feedback signal, controller 40 selects the first valley detection signal from output one of counter 93 to set latch 119 and enable transistor 33 at the first valley value V1 as illustrated by the dashed portion of plot 135 at time T1. Enabling transistor 33 approximately at the first valley value could possibly cause the off-time of the cycle of the switching drive signal to be greater than the off-time for the maximum discontinuous mode operating frequency. Thus, the additional off-time could decrease the operating frequency. Consequently, this increased off-time may also cause an increase in the value of the feedback signal. However, as long the value of the feedback signal remains within the first range of values, controller 40 continues to enable transistor 33 for each cycle of the switching drive signal approximately at the first valley value.

If the value of the feedback signal decreases to a value that is not within the first range of values, such as within the second range of values that is less than the reference voltage on node 84 but greater than the value of the voltage on node 83, controller 40 enables transistor 33 approximately at the second valley value responsively to the feedback signal being within the second range of values. If the feedback signal is within the second range of values, the output of comparator 68 is low, thus gate 95 is enabled to be controlled by the output of comparator 69. The output of comparator 69 is high for the second range of values. When comparator 60 detects the first valley value, counter 93 is incremented to force output one high. Since comparator 68 is low, controller 40 is inhibited from selecting the first valley detection signal, thus, controller 40 does not enable transistor 33. When comparator 60 detects the second valley value, counter 93 is incremented to force output two high. Since comparator 69 is high, controller 40 selects the second valley detection signal and sets latch 119 to enable transistor 33 responsively to the feedback signal being within the second range of values. Enabling transistor 33 approximately at the second valley value may decrease the operating frequency; however, as long the value of the feedback signal remains within the second range of values, controller 40 continues to enable transistor 33 for each cycle of the switching drive signal approximately at the second valley value. Those skilled in the art will appreciate that if the value of the feedback voltage subsequently increases to a value that is within the first range of values, controller 40 will revert back to enabling transistor 33 approximately at the first valley value responsively to the feedback signal again being within the first range of values.

Similarly, if the value of the feedback signal decreases to a third range of values that is not within the first or the second range of values, such as within the range of values that is greater than the reference voltage on node 82 but less than the value of the voltage on node 83, controller 40 enables transistor 33 approximately at the third valley value responsively to the feedback signal being within the third range of values. If the feedback signal is within the third range of values, the output of comparators 68 and 69 are low which forces the output of respective gates 104 and 105 low to inhibit controller 40 from selecting either of the first or second valley detection signals. Since the output of comparator 69 is low, gate 97 is enabled to be controlled by the output of comparator 70. The output of comparator 70 is high for the third range of values. When comparator 60 detects the first valley value, counter 93 is incremented to force output number one high. Since comparator 68 is low, controller 40 does not enable transistor 33. When comparator 60 detects the second valley value, counter 93 is again incremented to force output two high. Since comparator 69 is low, controller 40 does not enable transistor 33. When comparator 60 detects the third valley value, counter 93 is again incremented to force output three high. Since comparator 70 is high, controller 40 selects the third valley detection signal and sets latch 119 to enable transistor 33 responsively to the feedback signal being within the third range of values. Even though enabling transistor 33 approximately at the third valley value may decrease the operating frequency, as long the value of the feedback signal remains within the third range of values, controller 40 continues to enable transistor 33 for each cycle of the switching drive signal approximately at the third valley value.

Those skilled in the art will appreciate that controller 40 may be configured to detect N number of valley values by choosing the proper size of counter 93 in addition to choosing the corresponding number of comparators and reference voltage values for circuit 67.

If the value of the feedback voltage is less than a selected lower value or first value, controller 40 uses the oscillating frequency from VCO 110 to control the frequency at which transistor 133 is operated and inhibits using the valley values to operate transistor 33. If the value of the feedback voltage is less than a reference voltage on node 81 but greater than the voltage on return 44, the output of comparators 68-71 are low. The low from comparator 71 force the output of inverter 102 high thereby enabling gate 116 to be controlled by voltage controlled oscillator (VCO) 110. The oscillations from VCO 110 are used to set latch 119 and control the frequency at which transistor 133 is operated by the frequency of VCO 110. When operating in this mode, the peak value of current 32 is substantially constant and is set by the value of the reference voltage from ref 124.

In the preferred embodiment, comparators 68-71 have hysteresis, thus, the limits of each of the range of values in affected by the values of the hysteresis voltage of comparators 68-71. For example, in one embodiment comparators 68-71 had approximately 0.8 volts of hysteresis that was symmetrical to the center point of the hysteresis. In this embodiment, the value of the reference voltages on nodes 81-84 were 1.4 volts, 1.6 volts, 2.2 volts, and 2.8 volts respectively. Thus, comparators 71-68 received respective reference voltages of 1.4 volts, 1.6 volts, 2.2 volts, and 2.8 volts. Since comparators 68-71 had hysteresis, the upper and lower limits of the range of values depended on whether the value of the feedback voltage was increasing or decreasing. For increasing values of the feedback voltage, the output of comparator 71 was high from FB values that were greater than 1.6 volts, the output of comparator 70 was high from FB values that were greater than 2.0 volts, the output of comparator 69 was high from FB values that were greater than 2.6 volts, and the output of comparator 68 was high from FB values that were greater than 3.2 volts. For decreasing values of the FB signal, the output of comparator 68 remained high until the FB signal was less than 2.4 volts, the output of comparator 69 remained high until the FB signal was less than 1.8 volts, the output of comparator 70 remained high until the FB signal was less than 1.2 volts, and the output of comparator 71 remained high until the FB signal was less than 0.8 volts.

In order to facilitate this functionality for controller 40, startup circuit 57 is connected between input 43 and return 44 in order to receive the input voltage and form an operating voltage on an output 58. A first terminal of resistor 74 is connected to output 58 of circuit 57 and to input 49 of controller 40. A second terminal of resistor 74 is commonly connected to a first terminal of resistor 75, node 84, and an inverting input of comparator 68. A second terminal of resistor 75 is commonly connected to node 83, an inverting input of comparator 69, and a first terminal of resistor 76. A second terminal of resistor 76 is commonly connected to node 82, an inverting input of comparator 70, and a first terminal of resistor 77. A second terminal of resistor 77 is commonly connected to node 81, an inverting input of comparator 71, and a first terminal of resistor 78. A second terminal of resistor 78 is connected to return 44. A first terminal of pull-up resistor 56 is connected to output 58 of circuit 57. A second terminal of resistor 56 is commonly connected to input 52, an inverting input of comparator 111, and a non-inverting input of comparators 68-71. The output of comparator 68 is commonly connected to a first input of gate 104 and an input of inverter 94. The output of inverter 94 is connected to a first input of gate 95. The output of comparator 69 is commonly connected to an input of inverter 96 and a second input of gate 95. The output inverter 96 is connected to a first input of gate 97. The output of comparator 70 is connected to a second input of gate 97 and a first input of inverter 100. The output of inverter 100 is connected to a first input of gate 101. The output of comparator 71 is commonly connected to a second input of gate 101 and to an input of inverter 102. The output of inverter 102 is connected to a first input of gate 116. The output of gate 101 is connected to a first input of gate 107 which has an output connected to a first input of gate 108. The output of gate 97 is connected to a first input of gate 106 which has an output connected to a second input of gate 108. The output of gate 95 is connected to a first input of gate 105 which has an output connected to a third input of gate 108. The output of gate 104 is connected to a fourth input of gate 108. An output of gate 108 is connected to a first input of gate 117. A second input of gate 108 is connected to a first output of counter 93. A second output of counter 93 is connected to a second input of gate 105. A third output of counter 93 is connected to a second input of gate 106, and a fourth output of counter 93 is connected to a second input of gate 107. An output of gate 117 is connected to a set input of latch 119. The Q output of latch 119 is commonly connected to an input of driver 120 and to a gate of transistor 113. The output of driver 120 is connected to output 53. The Q bar output of latch 119 is connected to an input of delay circuit 65 which has an output connected to a first input of gate 64. A second input of gate 64 is connected to the output of comparator 60. An inverting input of comparator 60 is commonly connected to input 50 and to a cathode of diode 61. An anode of diode 61 is connected to return 44 and to a first terminal of reference 62. A second terminal of reference 62 is connected to a non-inverting input of comparator 60. Input 54 is connected to a non-inverting input of comparator 123 which has an inverting input commonly connected to node 125 and to an output of reference 124 through a diode 126. The output of comparator 123 is commonly connected to the reset input of latch 119 and to a reset input of counter 93. A clock input of counter 93 is connected to an output of gate 64. Input 47 of controller 40 is commonly connected to a non-inverting input of comparator 111, a first terminal of current source 112, and to a drain of transistor 113. A source of transistor 113 is connected to return 44. A second terminal of current source 112 is connected to output 58 of startup circuit 57. An output of comparator 111 is connected to a second input of gate 116 which has an output connected to a second input of gate 117.

Figure 3:
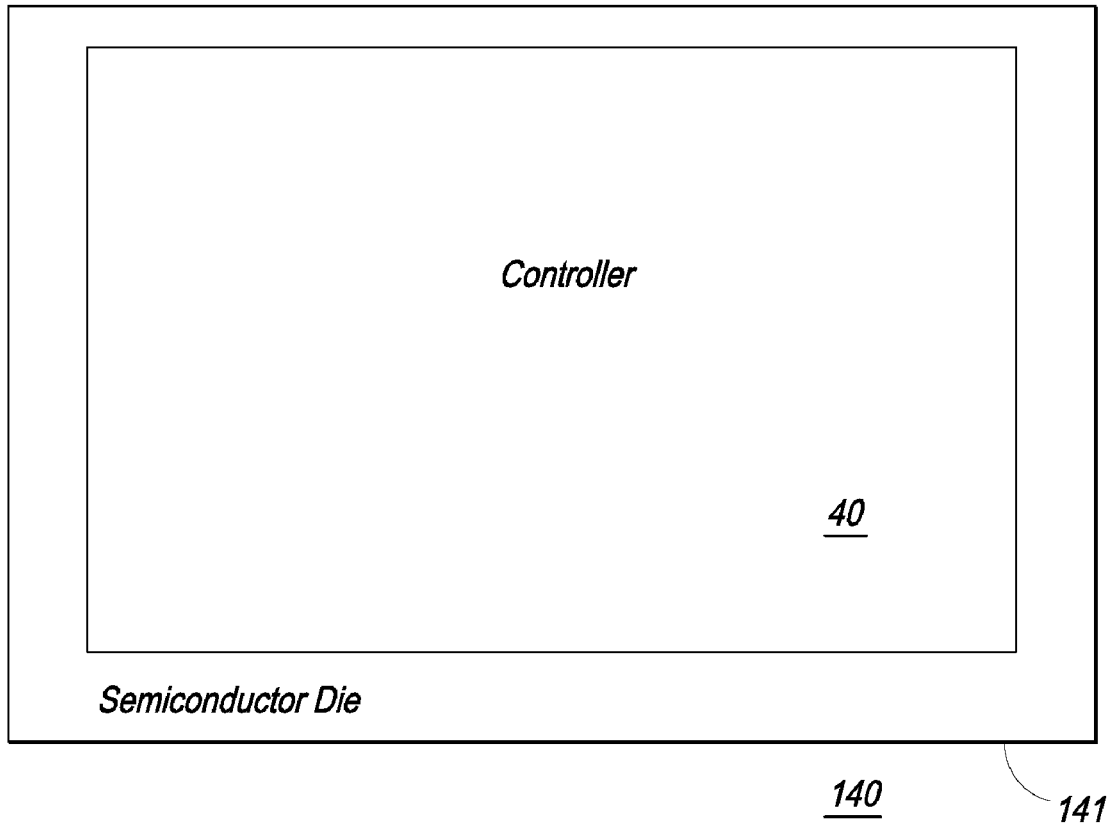
FIG. 3 illustrates an enlarged plan view of a semiconductor device that includes the power supply controller of FIG. 1 in accordance with the present invention.

FIG. 3 schematically illustrates an enlarged plan view of a portion of an embodiment of a semiconductor device or integrated circuit 140 that is formed on a semiconductor die 141. Controller 40 is formed on die 141. Die 141 may also include other circuits that are not shown in FIG. 3 for simplicity of the drawing. Controller 40 and device or integrated circuit 140 are formed on die 141 by semiconductor manufacturing techniques that are well known to those skilled in the art.

In view of all of the above, it is evident that a novel device and method is disclosed. Included, among other features, is forming a power supply controller to enable the power switch during one valley value of a plurality of valley values responsively to a value of the sense signal that is representative of an output voltage controlled by the power supply controller, or responsively to a range of values of the sense signal. Using one valley value for a range of values of the sense signal more accurately selects the proper time to enable the switch transistor. It also utilizes less complex circuitry than other methods of enabling the switch thereby lowering the costs.

For clarity of the explanation, the operation of the preferred embodiment is explained, however, it is evident that many alternatives and variations will be apparent to those skilled in the semiconductor arts. For example, various circuits and methods may be used to form the range of values of the feedback signal in addition to the particular implementation illustrated by circuit 67. Additionally, other circuits may be used to detect and count the valley values as long as they accurately detect the minimum value of the valley as accomplished by detector 59. Although transistor 33 and the current sense element of resistor 35 are illustrated to be external to controller, transistor 33 and a current sense element may be formed as a part of controller 40. The word "connected" is used throughout for clarity of the description, however, it is intended to have the same meaning as the word "coupled". Accordingly, "connected" should be interpreted as including either a direct connection or an indirect connection. Although the subject matter of the invention is described using an exemplary embodiment of a buck power supply controller, the invention is applicable to other power supply configurations.

The invention claimed is:

1. A switching power supply controller comprising:
a first output configured to control a switch current through both a switch and an inductor in order to regulate an output voltage to a desired value wherein the switching power supply controller is configured to form a switching drive signal in order to enable and disable the switch responsively to the switching drive signal and wherein disabling the switch creates oscillations of a switch voltage across the switch, the oscillations forming a plurality of peak values and a plurality of valley values of the switch voltage;
a first input configured to receive a sense signal that is representative of a value of the output voltage;
a detector configured to detect the plurality of valley values and form a plurality of valley detection signals responsively to the plurality of valley values wherein a first valley detection signal is representative of detecting a first valley value of the plurality of valley values and a second valley detection signal is representative of detecting a second valley value of the plurality of valley values that is different from the first valley value; and
a first circuit configured to use a first value of the sense signal and the first valley detection signal to selectively enable the switch during the first valley value that occurs during a first switching cycle of the switching drive signal, the first circuit configured to selectively enable the switch during the first valley value responsively to a second value of the sense signal and the first valley detection signal during a second switching cycle of the switching drive signal which is different from the first switching cycle, the second value of the sense signal being within a first range around the first value of the sense signal.

2. The switching power supply controller of claim 1 wherein the first circuit is configured to selectively enable the switch during the second valley value responsively to a third value of the sense signal and the second valley detection signal during a third switching cycle of the switching drive signal, the third value of the sense signal being outside the first range around the first value.

3. The switching power supply controller of claim 1 wherein the first circuit includes a plurality of comparators coupled to receive the sense signal and each comparator coupled to receive a different valley detection signal of the plurality of valley detection signals wherein successive comparators of the plurality of comparators are coupled to receive successively larger values of a reference voltage.

4. The switching power supply controller of claim 3 wherein a first comparator of the plurality of comparators is coupled to receive a first reference voltage and the first valley detection signal and form a first output signal, a second comparator of the plurality of comparators is coupled to receive a second reference voltage the second valley detection signal and form a second output signal wherein the first reference voltage is greater than the second reference voltage, and wherein the first circuit is configured to inhibit using the second output to selectively enable the switch if the first output is asserted.

5. The switching power supply controller of claim 4 wherein the first circuit includes a first AND gate having a first input coupled to receive the first output signal from the first comparator, a second input coupled to receive the first valley detection signal, and an output coupled to cause an assertion of the switching drive signal;
a first inverter having an input coupled to receive the first output signal from the first comparator and having an output;
a second AND gate having a first input coupled to receive the second output signal from the second comparator, a second input coupled to the output of the first inverter, and an output; and
a third AND gate having a first input coupled to the output of the second AND gate, a second input coupled to receive the second valley detection signal, and an output coupled to cause an assertion of the switching drive signal.

6. The switching power supply controller of claim 1 wherein the switching power supply controller includes a second input coupled to receive a switch signal that is representative of the switch voltage and wherein the detector includes a counter coupled to count successive occurrences of the plurality of valley values and form the plurality of valley detection signals.

7. The switching power supply controller of claim 6 wherein the detector includes a valley comparator coupled to receive the switch signal and form a clock signal to clock the counter responsively to any of the plurality of valley values.

8. The switching power supply controller of claim 1 further including a voltage controlled oscillator coupled to selectively control a frequency of the switching drive signal responsively to the first circuit wherein the first circuit is configured to inhibit the voltage controlled oscillator from controlling the switching drive signal until the output voltage is less than a first value that is representative of a minimum power consumption by a load that is coupled to receive the output voltage.

9. A method of forming a power supply controller comprising:
configuring the power supply controller to form a plurality of switching cycles to control a switch current through a switch in order to regulate an output voltage to a desired value wherein disabling the switch during a switching cycle of the plurality of switching cycles creates oscillations of a switch voltage across the switch, the oscillations forming a plurality of valley values of the switch voltage;

configuring a first circuit of the power supply controller to detect the plurality of valley values and responsively form a plurality of valley detection signals;

configuring a second circuit of the power supply controller to form a plurality of value ranges around a plurality of values of a sense signal that is representative of the output voltage wherein a different value range of the plurality of value ranges is formed around different values of the plurality of values of the sense signal;

configuring the second circuit to select one valley detection signal of the plurality of valley detection signals responsively to one value range of the plurality of value ranges; and configuring the power supply controller to enable the switch responsively to the selected one of the plurality of valley detection signals.

10. The method of claim 9 wherein configuring the first circuit of the power supply controller to detect the plurality of valley values and responsively form the plurality of valley detection signals includes configuring the first circuit to detect successive valley values after disabling the switch during a first switching cycle of the plurality of switching cycles.

11. The method of claim 9 wherein configuring the second circuit to select one valley detection signal includes configuring the second circuit to form a first range of values around a first value of the sense signal and to select a first valley detection signal of the plurality of valley detection signals responsively to the sense signal being within the first range of values.

12. The method of claim 11 further including configuring the second circuit to form a second range of values around a second value of the sense signal and to select a second valley detection signal of the plurality of valley detection signals responsively to the sense signal being within the second range of values.

13. The method of claim 12 further including configuring the second circuit to form a third range of values around a third value of the sense signal and to select a third valley detection signal of the plurality of valley detection signals responsively to the sense signal being within the third range of values.

14. The method of claim 9 further including configuring the power supply controller to control the switch responsively to a frequency of a VCO circuit for values of the sense signal that are less than the plurality of value ranges of the sense signal and not to enable the switch responsively to the selected one of the plurality of valley detection signals.

15. The method of claim 9 wherein configuring the first circuit of the power supply controller to detect the plurality of valley values and responsively form the plurality of valley detection signals includes configuring the first circuit to form a separate control signal for each valley value that is detected.

16. A method of forming a power supply controller comprising:

configuring the power supply controller to form a plurality of switching cycles to control a switch current through a switch in order to regulate an output voltage to a desired value wherein disabling the switch during a switching cycle of the plurality of switching cycles creates oscillations of a switch voltage across the switch, the oscillations forming a plurality of valley values of the switch voltage;

configuring the power supply controller to use a sense signal that is representative of the output voltage; and configuring the power supply controller to enable the switch during one valley value of the plurality of valley values responsively to a value of the sense signal.

17. The method of claim 16 wherein configuring the power supply controller to use the sense signal that is representative of the output voltage includes configuring the power supply controller to form a plurality of value ranges around a plurality of values of the sense signal wherein a different value range of the plurality of value ranges is formed around different values of the plurality of values of the sense signal.

18. The method of claim 17 wherein configuring the power supply controller to enable the switch during one valley value of the plurality of valley values responsively to the value of the sense signal includes configuring the power supply controller to select the one valley value responsively to one value range of the plurality of value ranges.

19. The method of claim 16 wherein configuring the power supply controller to enable the switch during one valley value of the plurality of valley values includes configuring the power supply controller to form a plurality of valley detection signals wherein a different valley detection signal is asserted for different valley values of the plurality of valley values and configuring the power supply controller to use a first valley detection signal of the plurality of valley detection signals to select the one valley value.

20. The method of claim 19 wherein configuring the power supply controller to use the first valley detection signal of the plurality of valley detection signals to select the one valley value includes configuring the power supply controller to use the value of the sense signal to select the first valley detection signal.

* * * * *